United States Patent
Nie

(10) Patent No.: US 12,135,996 B2
(45) Date of Patent: Nov. 5, 2024

(54) COMPUTING RESOURCE SCHEDULING METHOD, SCHEDULER, INTERNET OF THINGS SYSTEM, AND COMPUTER READABLE MEDIUM

(71) Applicant: Siemens Schweiz AG, Zürich (CH)

(72) Inventor: Kun Nie, ShanDong (CN)

(73) Assignee: SIEMENS SCHWEIZ AG, Zurich (CH)

( * ) Notice: Subject to any disclaimer, the term of this patent is extended or adjusted under 35 U.S.C. 154(b) by 687 days.

(21) Appl. No.: 17/434,517

(22) PCT Filed: Feb. 28, 2019

(86) PCT No.: PCT/CN2019/076474
§ 371 (c)(1),
(2) Date: Aug. 27, 2021

(87) PCT Pub. No.: WO2020/172852
PCT Pub. Date: Sep. 3, 2020

(65) Prior Publication Data
US 2022/0138012 A1    May 5, 2022

(51) Int. Cl.
*G06F 9/50* (2006.01)

(52) U.S. Cl.
CPC .......... *G06F 9/5038* (2013.01); *G06F 9/5044* (2013.01); *G06F 9/5088* (2013.01)

(58) Field of Classification Search
CPC .... G06F 9/5038; G06F 9/5044; G06F 9/5088; G06F 9/4881; G06F 9/5005; H04Q 2209/40; H04Q 2209/70; H04Q 9/00
See application file for complete search history.

(56) References Cited

U.S. PATENT DOCUMENTS

| | | | |
|---|---|---|---|
| 9,082,354 B2 | 7/2015 | Fujinaka | |
| 2004/0133387 A1 | 7/2004 | Volkel | ........................... 702/177 |
| 2018/0270841 A1 | 9/2018 | Iijima | |

(Continued)

FOREIGN PATENT DOCUMENTS

| | | | | |
|---|---|---|---|---|
| CN | 106326003 A | 1/2017 | ............... | G06F 9/50 |
| CN | 106874100 A | 6/2017 | ............... | G06F 9/50 |

(Continued)

OTHER PUBLICATIONS

Search Report for International Application No. PCT/CN2019/076474, 9 pages, Jun. 6, 2019.

(Continued)

*Primary Examiner* — Kevin L Young
*Assistant Examiner* — Phuong N Hoang
(74) *Attorney, Agent, or Firm* — Slayden Grubert Beard PLLC

(57) ABSTRACT

Various embodiments of the teachings herein include a resource scheduling method comprising: receiving data to be processed collected by a sensor in an Internet of Things system; determining a processing priority of the data to be processed; predicting, according to the determined processing priority, a computing resource amount and duration required for processing the data to be processed; and scheduling a computing resource of an edge computing device in the IoT system according to the predicted computing resource amount and duration to process the data to be processed.

17 Claims, 5 Drawing Sheets

(56) References Cited

U.S. PATENT DOCUMENTS

| | | | | |
|---|---|---|---|---|
| 2019/0068475 A1* | 2/2019 | Wagstaff | ................. | H04L 43/16 |
| 2019/0394096 A1* | 12/2019 | Bernat | .................... | G06F 11/30 |
| 2020/0167205 A1* | 5/2020 | Guim Bernat | .......... | H04L 49/70 |
| 2021/0011765 A1* | 1/2021 | Doshi | ................... | G06F 9/5077 |
| 2021/0109584 A1* | 4/2021 | Guim Bernat | ...... | H04L 41/0895 |
| 2022/0351553 A1* | 11/2022 | Heiser | ................. | G07C 5/0816 |

FOREIGN PATENT DOCUMENTS

| | | | | |
|---|---|---|---|---|
| CN | 108171259 A | 6/2018 | ............ | G01N 33/18 |
| CN | 108243246 A | 7/2018 | ............ | H04L 29/08 |
| CN | 108965160 | 12/2018 | ........... | H04L 12/851 |
| WO | 2018 206992 | 11/2018 | ............ | H04W 72/12 |

OTHER PUBLICATIONS

Extended European Search Report, Application No. 19917015.0, 11 pages, Sep. 2, 2022.
Yu, Xianbin et al., "Mobile Edge Computing Technique in Future Mobile Communication Network," Journal of Nanjing University of Aeronautics & Astronautics, vol. 50, No. 5, pp. 586-594 (Chinese w/ English Abstract), Oct. 31, 2018.
Chinese Office Action, Application No. 201980084832.7, 7 pages, Mar. 12, 2024.

\* cited by examiner

US 12,135,996 B2

COMPUTING RESOURCE SCHEDULING METHOD, SCHEDULER, INTERNET OF THINGS SYSTEM, AND COMPUTER READABLE MEDIUM

CROSS-REFERENCE TO RELATED APPLICATIONS

This application is a U.S. National Stage Application of International Application No. PCT/CN2019/076474 filed Feb. 28, 2019, which designates the United States of America, the contents of which are hereby incorporated by reference in their entirety.

TECHNICAL FIELD

The present disclosure relates to distributed computing technology. Various embodiments may include computing resource scheduling methods, schedulers, Internet of Things (IoT) systems, and/or computer readable media.

BACKGROUND

Distributed computing, in contrast to centralized computing, includes dividing a computing task into a plurality of small parts, and the small parts are distributed to a plurality of devices and completed by the devices. In a conventional IoT system, centralized computing is usually used to perform data processing. An IoT device is relatively far away from a cloud platform, resulting in relatively long data transmission latency. Therefore, for an application scenario having a relatively high latency requirement, for example, an industrial IoT system, if distributed computing is used and a computing resource of an edge computing device is used, data transmission latency can be effectively reduced, and fewer network bandwidths and cloud resources can be occupied. In edge computing, how to effectively manage the computing resource is crucial for improvement of computing efficiency. Task scheduling is a main manner of managing the computing resource and can improve system efficiency and improve service quality.

SUMMARY

The present disclosure describes a computing resource scheduling method, a scheduler, an IoT system, and a computer readable medium in distributed computing. For example, some embodiments of the teachings herein include a resource scheduling method comprising: receiving data to be processed which is collected by a sensor in an Internet of Things (IoT) system; determining a processing priority of the data to be processed; predicting, according to the determined processing priority, a computing resource amount and duration required for processing the data to be processed; and scheduling a computing resource of an edge computing device in the IoT system according to the predicted computing resource amount and duration to process the data to be processed.

In some embodiments, determining a processing priority of the data to be processed comprises determining the processing priority of the data to be processed, wherein a larger fluctuation amplitude of a value of a physical quantity represented by the data to be processed indicates a higher processing priority of the data to be processed.

In some embodiments, predicting, according to the determined processing priority, a computing resource amount and duration required for processing the data to be processed comprises predicting, according to the determined processing priority, the computing resource amount and the duration required for processing the data to be processed, wherein a higher processing priority indicates sooner prediction, for the data to be processed, of the computing resource amount and the duration required for processing the data to be processed.

In some embodiments, predicting, according to the determined processing priority, a computing resource amount and duration required for processing the data to be processed comprises: searching for a computing resource amount and duration occupied during processing of historical data, wherein the historical data is similar to the data to be processed in length, sensor type, and processing priority; and predicting, according to the found computing resource amount and duration occupied during the processing of the historical data, the computing resource amount and the duration required for processing the data to be processed.

In some embodiments, the method includes scheduling a computing resource of an edge computing device in the IoT system according to the predicted computing resource amount and duration to process the data to be processed comprises selecting a computing resource of an edge computing device that satisfies the predicted computing resource amount and duration from edge computing devices in the IoT system, to process the data to be processed.

In some embodiments, the method includes recording (305), after the data to be processed has been processed, a computing resource amount and duration used for processing the data to be processed.

As another example, some embodiments include a scheduler, comprising: at least one memory, configured to store a computer readable code; and at least one processor, configured to execute the computer readable code stored in the at least one memory, to perform following steps: receiving data to be processed which is collected by a sensor in an Internet of Things (IoT) system; determining a processing priority of the data to be processed; predicting, according to the determined processing priority, a computing resource amount and duration required for processing the data to be processed; and scheduling a computing resource of an edge computing device in the IoT system according to the predicted computing resource amount and duration to process the data to be processed.

In some embodiments, when determining a processing priority of the data to be processed, the at least one processor is further configured to perform following step determining the processing priority of the data to be processed, wherein a larger fluctuation amplitude of a value of a physical quantity represented by the data to be processed indicates a higher processing priority of the data to be processed.

In some embodiments, when predicting, according to the determined processing priority, a computing resource amount and duration required for processing the data to be processed, the at least one processor is further configured to predict, according to the determined processing priority, the computing resource amount and the duration required for processing the data to be processed, wherein a higher processing priority indicates sooner prediction, for the data to be processed, of the computing resource amount and the duration required for processing the data to be processed.

In some embodiments, when predicting, according to the determined processing priority, a computing resource amount and duration required for processing the data to be processed, the at least one processor is further configured to perform following steps: searching for a computing resource amount and duration occupied during processing of historical data, wherein the historical data is similar to the data to be processed in length, sensor type, and processing priority; and predicting, according to the found computing resource amount and duration occupied during the processing of the historical data, the computing resource amount and the duration required for processing the data to be processed.

In some embodiments, when scheduling a computing resource of an edge computing device in the IoT system according to the predicted computing resource amount and duration to process the data to be processed, the at least one processor is further configured to select a computing resource of an edge computing device that satisfies the predicted computing resource amount and duration from edge computing devices in the IoT system, to process the data to be processed.

In some embodiments, the at least one processor is further configured to record, after the data to be processed has been processed, a computing resource amount and duration used for processing the data to be processed.

As another example, some embodiments include a storage medium, storing a computer readable code, wherein when the computer readable code is executed by at least one processor, the computer readable code is configured to perform following steps: receiving data to be processed which is collected by a sensor in an Internet of Things (IoT) system; determining a processing priority of the data to be processed; predicting, according to the determined processing priority, a computing resource amount and duration required for processing the data to be processed; and scheduling a computing resource of an edge computing device in the IoT system according to the predicted computing resource amount and duration to process the data to be processed.

In some embodiments, when determining a processing priority of the data to be processed, the computer readable code is further configured to determine the processing priority of the data to be processed, wherein a larger fluctuation amplitude of a value of a physical quantity represented by the data to be processed indicates a higher processing priority of the data to be processed.

In some embodiments, when predicting, according to the determined processing priority, a computing resource amount and duration required for processing the data to be processed, the computer readable code is further configured to predict, according to the determined processing priority, the computing resource amount and the duration required for processing the data to be processed, wherein a higher processing priority indicates sooner prediction, for the data to be processed, of the computing resource amount and the duration required for processing the data to be processed.

In some embodiments, when predicting, according to the determined processing priority, a computing resource amount and duration required for processing the data to be processed, the computer readable code is further configured to search for a computing resource amount and duration occupied during processing of historical data, wherein the historical data is similar to the data to be processed in length, sensor type, and processing priority; and predict, according to the found computing resource amount and duration occupied during the processing of the historical data, the computing resource amount and the duration required for processing the data to be processed.

In some embodiments, when scheduling a computing resource of an edge computing device in the IoT system according to the predicted computing resource amount and duration to process the data to be processed, the computer readable code is further configured to select a computing resource of an edge computing device that satisfies the predicted computing resource amount and duration from edge computing devices in the IoT system, to process the data to be processed.

In some embodiments, the computer readable code is further configured to record, after the data to be processed has been processed, a computing resource amount and duration used for processing the data to be processed.

As another example, some embodiments include an Internet of Things (IoT) system comprising: a sensor; a data collection module, connected to the sensor; at least one edge computing device, configured to provide a computing resource required for data processing to the IoT system; and a scheduler, connected to the data collection module, and configured to: receive, from the data collection module, data to be processed which is collected by the sensor (10); determine a processing priority of the data to be processed; predict, according to the determined processing priority, a computing resource amount and duration required for processing the data to be processed; and schedule a computing resource of the at least one edge computing device according to the predicted computing resource amount and duration to process the data to be processed.

As another example, some embodiments include an edge distributed data processing system, configured to process data collected by a sensor in an Internet of Things (IoT) system, and comprising: at least one edge computing device, configured to provide a computing resource required for data processing to the IoT system; and a scheduler configured to: receive, from a data collection module in the IoT system, data to be processed which is collected by a sensor; determine a processing priority of the data to be processed; predict, according to the determined processing priority, a computing resource amount and duration required for processing the data to be processed; and schedule a computing resource of the at least one edge computing device according to the predicted computing resource amount and duration to process the data to be processed.

DETAILED DESCRIPTION

Figure 1:
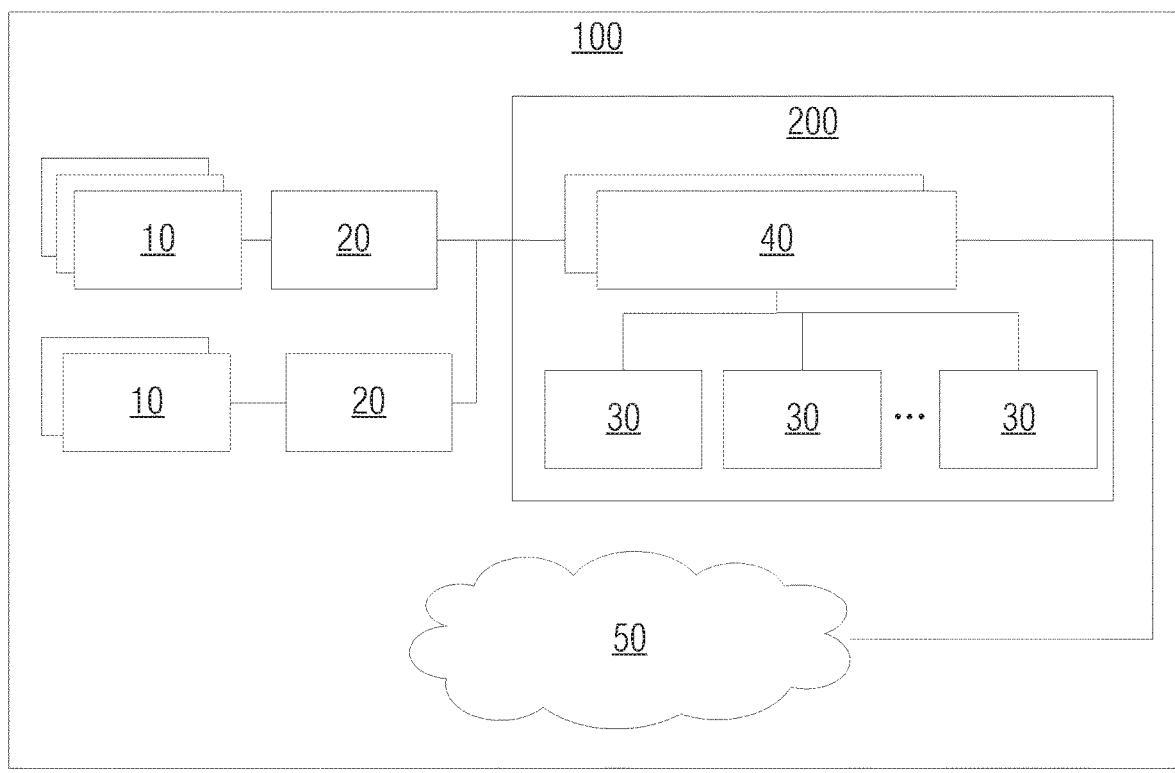
FIG. 1 is a schematic structural diagram of an IoT system and an edge distributed data processing system incorporating teachings of the present disclosure.

In some embodiments, an IoT system includes: a sensor; a data collection module connected to the sensor; at least one edge computing device, configured to provide a computing resource required for data processing to the IoT system; and a scheduler, connected to the data collection module, and configured to: receive, from the data collection module, data to be processed which is collected by the sensor; determine a processing priority of the data to be processed; predict, according to the determined processing priority, a computing resource amount and duration required for processing the data to be processed; and schedule a computing resource of the at least one edge computing device according to the predicted computing resource amount and duration to process the data to be processed.

incorporating teachings of the present disclosure, an edge distributed data processing system is configured to process data collected by a sensor in an IoT system. The system may include: at least one edge computing device, configured to provide a computing resource required for data processing to the IoT system; and a scheduler, configured to: receive, from a data collection module in the IoT system, data to be processed which is collected by a sensor; determine a processing priority of the data to be processed; predict, according to the determined processing priority, a computing resource amount and duration required for processing the data to be processed; and schedule a computing resource of the at least one edge computing device according to the predicted computing resource amount and duration to process the data to be processed.

In some embodiments, a resource scheduling method may include the following steps: receiving data to be processed which is collected by a sensor in an IoT system; determining a processing priority of the data to be processed; predicting, according to the determined processing priority, a computing resource amount and duration required for processing the data to be processed; and scheduling a computing resource of an edge computing device in the IoT system according to the predicted computing resource amount and duration to process the data to be processed.

In some embodiments, a scheduler may include: a receiving module, configured to receive data to be processed which is collected by a sensor in an IoT system; a priority determining module, configured to determine a processing priority of the data to be processed; and a scheduling module, configured to: predict, according to the processing priority determined by the priority determining module, a computing resource amount and duration required for processing the data to be processed; and schedule a computing resource of an edge computing device in the IoT system according to the predicted computing resource amount and duration to process the data to be processed.

In some embodiments, a scheduler includes: at least one memory, configured to store a computer readable code; and at least one processor, configured to execute the computer readable code stored in the at least one memory, to perform the methods described herein.

In some embodiments, a storage medium stores a computer readable code, where when the computer readable code is executed by at least one processor, the method provided in the third aspect is performed. A computing resource is managed in a scheduling manner. A processing priority of data to be processed is determined. A computing resource amount and duration required for data processing are predicted according to the processing priority. A computing resource of an edge computing device is scheduled based on the predicted computing resource amount and duration to perform data processing. Accurate priority-based scheduling is implemented, and the computing resource amount and the duration required for data processing are ensured, so that resources can be optimally scheduled, and data processing tasks can be efficiently completed.

In the foregoing aspects, optionally, a larger fluctuation amplitude of a value of a physical quantity represented by the data to be processed indicates a higher processing priority of the data to be processed. When determining the processing priority, fluctuation of the value of the physical quantity represented by the data to be processed is considered. When a fluctuation amplitude is large, it is considered the data to be processed should be processed, so that an emergency such as a device fault is handled in real time, and computing resources can be effectively allocated to urgent problems.

In the foregoing aspects, optionally, a higher processing priority indicates sooner prediction, for the data to be processed, of the computing resource amount and the duration required for processing the data to be processed. Processing based on a FIFO mechanism further ensures timely processing of data to be processed which is with a high priority.

In some embodiments, when the computing resource amount and the duration required for processing the data to be processed are predicted according to the determined processing priority, and a computing resource amount and duration occupied during processing of historical data may be searched for, where the historical data is similar to the data to be processed in length, sensor type, and processing priority; and the computing resource amount and the duration required for processing the data to be processed are predicted according to the found computing resource amount and duration occupied during the processing of the historical data. Because reference is made to information about the historical data, a prediction result is more accurate, and accurate and reliable information is provided for further allocation of computing resources.

In some embodiments, a computing resource of an edge computing device that satisfies the predicted computing resource amount and duration is selected from edge computing devices in the IoT system, to process the data to be processed. In this way, a processing requirement of the data to be processed can be satisfied.

In some embodiments, after the data to be processed has been processed, a computing resource amount and duration used for processing the data to be processed are recorded for use as historical data for subsequent data processing to provide reference for prediction of the computing resource amount and the duration.

| List of reference numerals: | |
|---|---|
| 100: | IoT system |
| 10: | Sensor |
| 20: | Data collection module |
| 30: | Edge computing device |
| 40: | Scheduler |
| 50: | Cloud |
| 200: | Edge distributed data processing system |
| 300: | Resource scheduling method |
| 401: | Receiving module |
| 402: | Priority determining module |
| 403: | Scheduling module |
| 404: | Recording module |
| 405: | At least one memory |
| 406: | At least one processor |
| 407: | Communications module |
| 408: | Bus |
| 409: | Historical data |
| 410: | Information about available computing resources |
| S301: | Receive data to be processed |
| S302: | Determine a priority of the data to be processed |
| S303: | Predict a computing resource amount and duration |
| S305: | Record a computing resource amount and duration used for processing the data to be processed |
| S306: | Obtain information about available computing resources |
| S3031: | Determine whether there is historical data similar to the data to be processed |
| S3032: | Predict, according to the historical data, the computing resource amount and the duration of the data to be processed |

-continued

List of reference numerals:

| | |
|---|---|
| S304: | Schedule an edge computing device that satisfies the predicted computing resource amount and duration |
| S304': | Schedule an edge computing device that has the shortest latency and a computing resource availability ratio exceeding a threshold |

DETAILED DESCRIPTION

To make the objectives, technical solutions, and advantages of the teachings of the present disclosure clearer and more comprehensible, the following further describes embodiments of thereof in detail with reference to the accompanying drawings. The subsequently described embodiments are only some embodiments rather than all the embodiments of the teachings of the present disclosure.

FIG. 1 is a schematic structural diagram of an IoT system and an edge distributed data processing system according to an embodiment of the present invention. As shown in FIG. 1, an IoT system 100 may include: at least one sensor 10, where the sensor 10 is used as a field device and collects data of a connected device, to monitor an operating status and so on of the device; a data collection module 20, connected to each sensor 10, and configured to: collect data collected by the connected sensor 10, where the data is, for example, temperature data collected by a temperature sensor, pressure data collected by a pressure sensor, and a liquid flow speed data collected by a flow sensor, the data collected by the sensor may be used for monitoring the operating status and the like of the device connected to the sensor, and is crucial for normal operation of the device and timely discovery of a fault, one sensor 10 may be connected to at least one data collection module 20, one data collection module 20 may also be connected to at least one sensor 10, the data collection module 20 may be a System on a Chip (SOC) device, a microprocessor, or the like, and data from the sensor collected by the data collection module 20 is sent to a scheduler 40; at least one edge computing device 30, configured to provide a computing resource required for data processing for the IoT system 100, where the computing resource may include a central processing unit, a memory, and the like, an amount of available computing resources may be measured by using central processing unit usage and memory usage, edge computing devices 30 may be organized in a manner of a device cluster, and each edge computing device 30 is used as a node in the cluster, and is scheduled by the scheduler 40; and at least one scheduler 40, where the scheduler 40 may be an intelligent edge device, has a processing capability, receives data to be processed from the data collection module 20, is connected to the edge computing device 30, and is configured to: receive, from the data collection module 20, data to be processed which is collected by the sensor 10; determine a processing priority of the data to be processed; predict, according to the determined processing priority, a computing resource amount and duration required for processing the data to be processed; and schedule a computing resource of the at least one edge computing device 30 according to the predicted computing resource amount and duration to process the data to be processed.

The IoT system 100 may further include a cloud 50. The cloud 50 usually has more computing resources than an edge device, and a task that does not have a high latency requirement may be processed by the cloud 50. In FIG. 1, an edge distributed data processing system 200 consists of the edge computing devices 30 and the scheduler 40. It should be noted that the edge distributed data processing system 200 may be regarded as a part of the IoT system 100 or may exist independently of the IoT system 100.

In some embodiments, the scheduler 40 determines the priority of the data to be processed, predicts the computing resource amount and the duration required for processing the data to be processed, and schedules the computing resource based on the predicted computing resource amount and duration. Accurate priority-based scheduling is implemented, and the computing resource amount and the duration required for data processing are ensured, so that resources can be optimally scheduled, and data processing tasks can be efficiently completed. The following further describes the scheduler 40 with reference to FIG. 2, FIG. 3, and FIG. 4.

Figure 2:
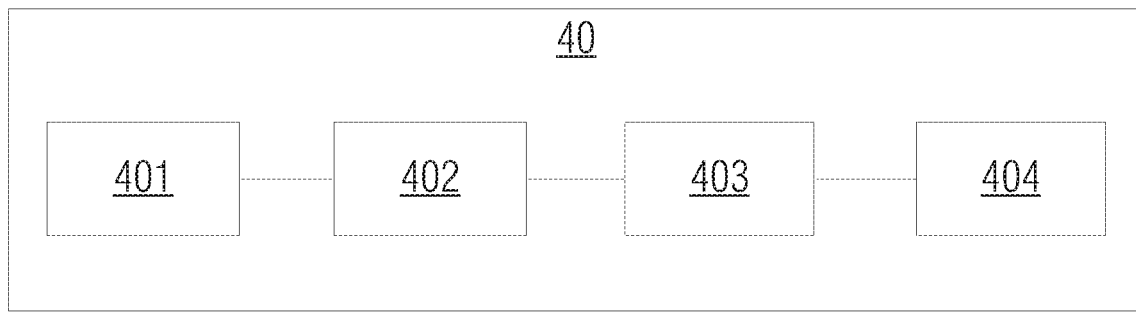
FIG. 2 is a schematic structural diagram of a scheduler incorporating teachings of the present disclosure.

FIG. 2 is a schematic structural diagram of the scheduler 40. As shown in FIG. 2, the scheduler 40 may include: a receiving module 401, configured to receive data to be processed which is collected by a sensor 10 in an IoT system 100; a priority determining module 402, configured to determine a processing priority of the data to be processed; and a scheduling module 403, configured to: predict, according to the processing priority determined by the priority determining module 402, a computing resource amount and duration required for processing the data to be processed; and schedule a computing resource of an edge computing device in the IoT system according to the predicted computing resource amount and duration to process the data to be processed.

In some embodiments, the scheduler 40 may further include a recording module 404, configured to record, after the data to be processed has been processed, a computing resource amount and duration used for processing the data to be processed for use as historical data for subsequent data to be processed to provide reference for prediction of the computing resource amount and the duration required for the subsequent data to be processed. A procedure of modules in the scheduler 40 processing the data to be processed is described below with reference to FIG. 4.

In step S301, the receiving module 401 receives, from a data collection module 20 in the IoT system 100, data to be processed which is collected by a sensor.

In step S302, the priority determining module 402 determines a processing priority of the data to be processed. Optionally, a larger fluctuation amplitude of a value of a physical quantity represented by the data to be processed indicates a higher processing priority of the data to be processed. Specifically, the priority determining module 402 may generate, according to previous data collected by the sensor 10, an upper limit and a lower limit of a value of a physical quantity represented by the data. Herein, t distribution may be used to estimate the upper limit and the lower limit.

For the t distribution, if there are n data samples (n is a positive integer), and x is a sample of data collected by the sensor 10, an upper limit $v_u$ and a lower limit $v_l$ may be represented as:

$$v_u = \overline{X} + t_{(a,n-1)} \frac{S_n}{\sqrt{n}}, \text{ and}$$

-continued $$v_l = \overline{X} - t_{(a,n-1)} \frac{S_n}{\sqrt{n}}$$

Herein, $\overline{X}$ represents an average value of the t distribution, $S_n$ represents a standard deviation of the t distribution, and $t_{(a,n-1)}$ represents a standard t distribution coefficient when a quantity of samples is n.

At a given moment t, a value of a physical quantity represented by data collected by the sensor 10 is represented as $v_t$. In this way, at the given moment t, a processing priority p of data collected by a sensor may be calculated by using the following formula:

$$p = \left| \frac{(v_u - v_t)^2 - (v_l - v_t)^2}{(v_u - v_l)^2} \right|$$

A larger p value indicates a higher processing priority of data, so that the data should be processed more preferentially.

The foregoing formula is merely an example. A physical meaning of the formula lies in that a larger fluctuation amplitude of a physical quantity represented by data collected by a sensor 10 indicates a higher possibility that a fault occurs in a device monitored by the sensor 10. In this case, the data should be processed preferentially. As shown by a queue behind a block 402 in FIG. 4, data to be processed which is collected by sensors 10 may be sorted in the queue according to respective processing priorities, and a First In First Out (FIFO) policy may be used for processing. A next step S303 is preferentially performed to process data to be processed which is with a high processing priority. That is, a higher processing priority indicates sooner prediction, for the data to be processed, of the computing resource amount and the duration required for processing the data to be processed.

In step S303, the scheduling module 403 predicts, according to the determined processing priority, a computing resource amount and duration required for processing the data to be processed; and schedules a computing resource of an edge computing device in the IoT system according to the predicted computing resource amount and duration to process the data to be processed.

Figure 5:
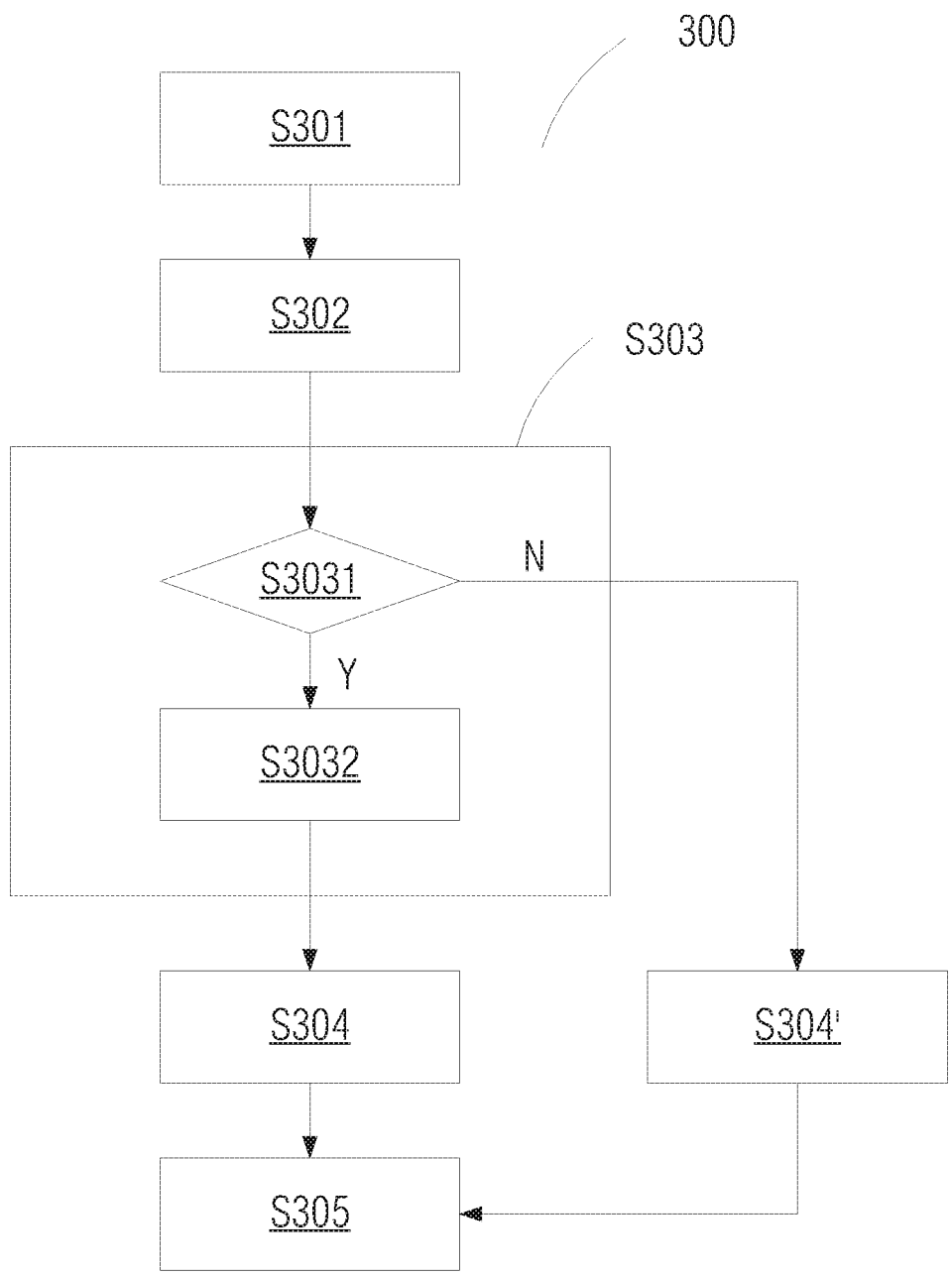
FIG. 5 is a flowchart of a resource scheduling method incorporating teachings of the present disclosure.

Specifically, referring to FIG. 5, in sub step S3031 of step S303, the scheduling module 403 may search for historical data similar to the data to be processed, for example, search for a computing resource amount and duration occupied during processing of the historical data, where the historical data is similar to the data to be processed in length, sensor type, and processing priority. If the scheduling module 403 finds the historical data, the scheduling module 403 further performs sub step S3032, or otherwise the scheduling module 403 performs step S304'. A rule of determining "similar" may be preset.

For example, if the length of the data to be processed does not exceed 110% of a length of the historical data and is not less than 90% of the length of the historical data, it is determined that the data to be processed is similar to the historical data in length. If the sensor 10 collecting the data to be processed and a sensor collecting the historical data have a same type, it is determined that the data to be processed is similar to the historical data in sensor type. If a processing priority of the data to be processed is higher than a processing priority of the historical data by one or two levels or is equal to the processing priority of the historical data or is lower than the processing priority of the historical data by one level, it is determined that the data to be processed is similar to the historical data in processing priority. If there are similarities in length, processing priority, and sensor type, it is determined that the data to be processed is similar to the historical data. The foregoing determining rule is merely an example. During actual application, the determining rule may be flexibly set according to a specific application scenario.

In sub step S3032, the scheduling module 403 may predict, according to the found computing resource amount and duration occupied during the processing of the historical data, the computing resource amount and the duration required for processing the data to be processed.

Further, in step S304, the scheduling module 403 may schedule a computing resource of the edge computing device in the IoT system according to the predicted computing resource amount and duration to process the data to be processed, for example, selects a computing resource of an edge computing device 30 that satisfies the predicted computing resource amount and duration from edge computing devices 30 in the IoT system 100, to process the data to be processed. In some embodiments, if a plurality of edge computing devices 30 satisfying requirements exists, a device having the shortest network latency to the scheduler 40 is further selected from the edge computing devices 30, to reduce data processing latency.

In step S304', the scheduling module 403 may select an edge computing device 30 that has the shortest network latency to the scheduler 40 and an amount of available computing resources being greater than a given threshold (for example, 30%) of a total amount of computing resources of the edge computing device 30, to process the data to be processed. If such an edge computing device 30 is not found, optionally, an alarm is raised.

Further, in step S305, after the data to be processed has been processed, the recording module 404 may record a computing resource amount and duration used for processing the data to be processed in a database of historical data 409. In the database, a length, a processing priority, and a required computing resource amount and duration of data to be processed that corresponds to each sensor type may be stored. In this way, after the scheduling module 403 receives a piece of data to be processed, the scheduling module 403 may search the historical data 409 according to a type of the sensor 10 that collects the data to be processed, a processing priority of the data to be processed, and a length of the data to be processed to find a similar record to predict a computing resource amount and duration.

Further, the scheduling module 403 may use a heartbeat mechanism to obtain an amount of available computing resources (for example, central processing unit usage and memory usage) and a status of a computing resource in each edge computing device 30, where the status is, for example, "available", "unavailable", or "occupied", to schedule a computing resource of a suitable edge computing device 30 when processing the data to be processed. The scheduling module 403 may store the obtained information in information 410 about available computing resources. Because the information needs to be frequently accessed, optionally, a nosql mechanism (for example, redis) may be used to store the information.

Figure 3:
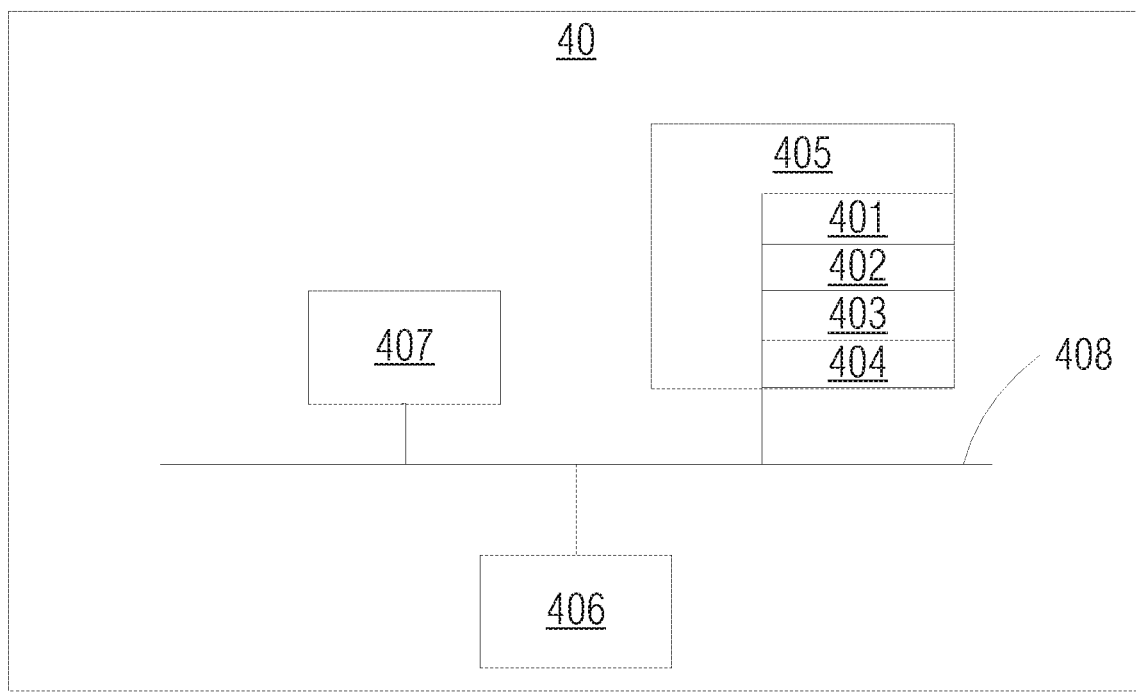
FIG. 3 is another schematic structural diagram of a scheduler incorporating teachings of the present disclosure.

FIG. 3 is another schematic structural diagram of a scheduler incorporating teachings of the present disclosure. As shown in FIG. 3, the scheduler 40 may include at least one memory 405, configured to store a computer readable code; and at least one processor 406, configured to execute the computer readable code stored in the memory 405, to perform the foregoing method 300. The at least one memory 405, the at least one processor 406, and a communications module 407 may be connected to each other by using a bus 408. The communications module 407 communicates with an external device such as the data collection module 20, the edge computing device 30, and the cloud 50 under the control of the at least one processor 406. The modules included in the scheduler 40 in FIG. 2 and FIG. 4 may be regarded as program modules written by the computer readable code stored in the memory 405. When the program modules are invoked by the processor 406, the program modules can perform the foregoing method 300.

FIG. 5 is a flowchart of a resource scheduling method incorporating teachings of the present disclosure. The method 300 may include the following steps:

S301: Receive data to be processed.

S302: Determine a priority of the data to be processed.

S303: Predict a computing resource amount and duration. Step S303 may include substeps S3031 and S3032.

S3031: Determine whether there is historical data similar to the data to be processed, and if there is historical data similar to the data to be processed, perform substep S3032, or otherwise, perform step S304'.

S3032: Predict, according to the historical data, the computing resource amount and the duration of the data to be processed, and then perform step S304.

S304: Schedule an edge computing device that satisfies the predicted computing resource amount and duration, and then perform step S305.

S304': Schedule an edge computing device that has the shortest latency and a computing resource availability ratio exceeding a threshold.

S305: Record a computing resource amount and duration used for processing the data to be processed.

Figure 4:
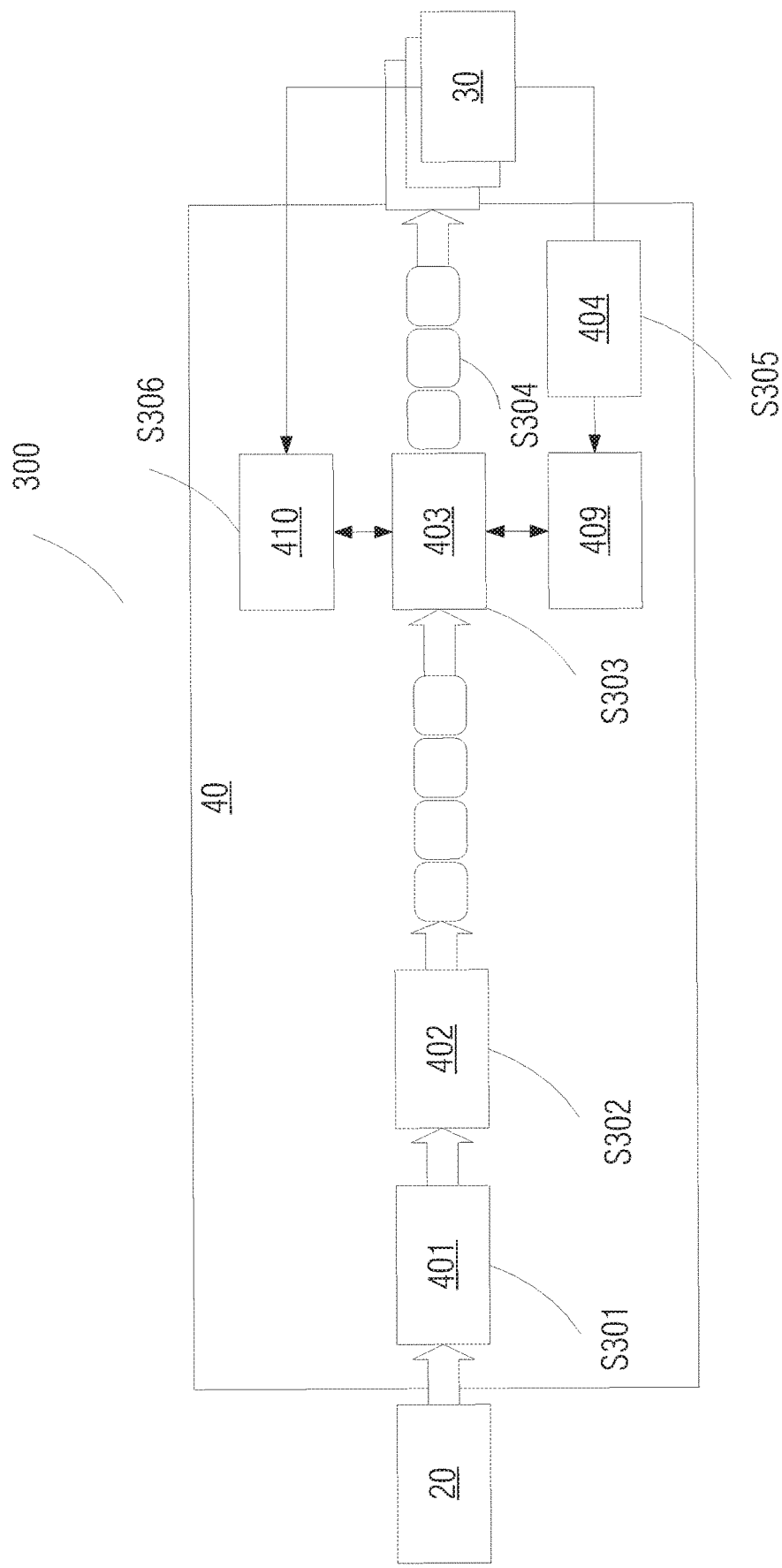
FIG. 4 shows a process in which modules in a scheduler coordinate with each other to complete task scheduling incorporating teachings of the present disclosure.

For other optional implementations of the foregoing method steps, refer to description of FIG. 4. Details are not described herein again.

Figure 6:
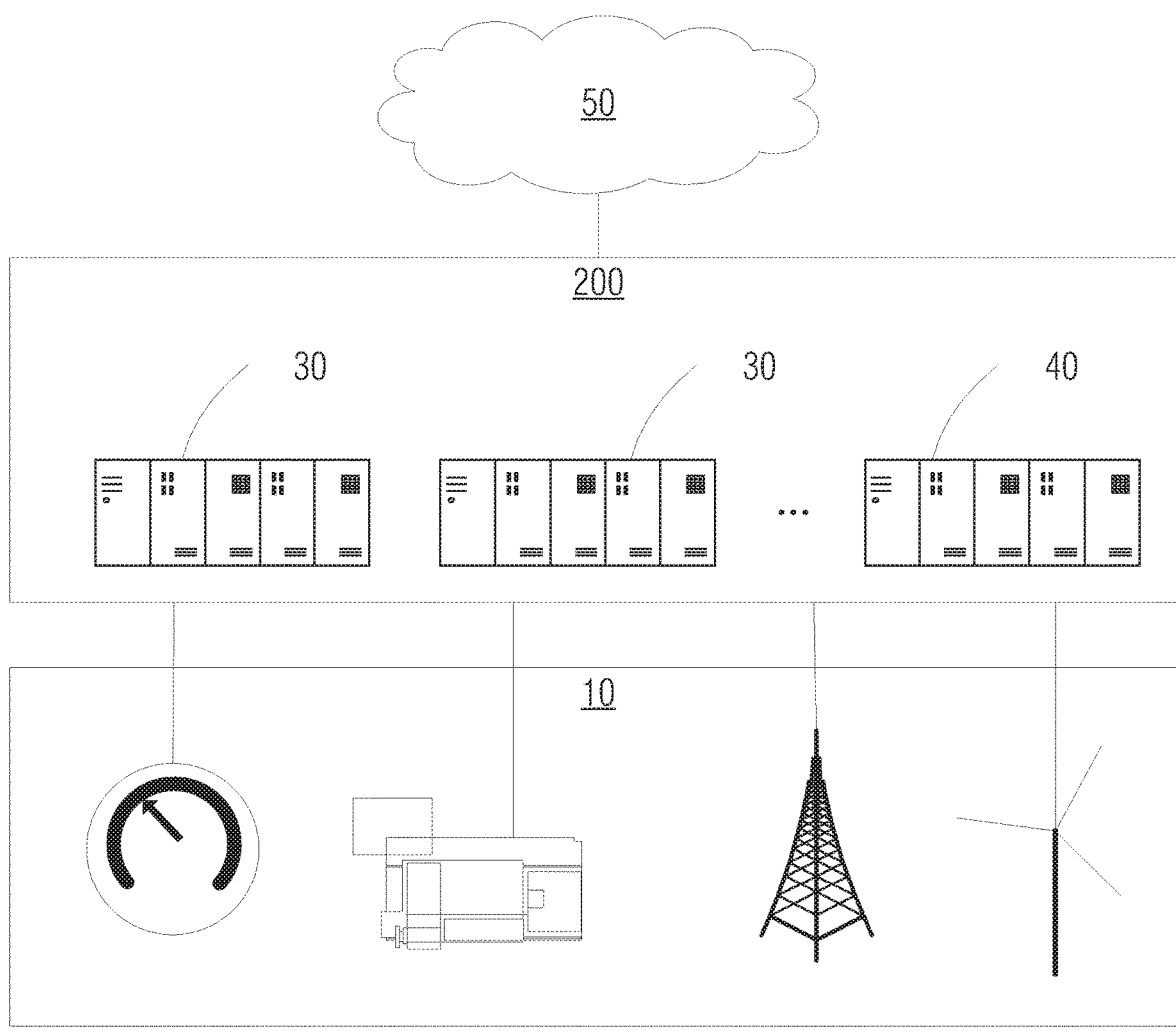
FIG. 6 is a schematic diagram of a scenario to which embodiments of the present teachings may be applied.

FIG. 6 is a schematic diagram of a scenario to which embodiments of the present teachings may be applied. The edge distributed data processing system 200 deployed at an edge may implement data monitoring on an IoT system (for example, a building or a factory). Data is collected by sensors 10 and is processed at an edge, and the cloud 50 may be used as a data warehouse to store business logic (for example, a data report).

In some embodiments, there is a computer readable medium storing a computer readable code. When the computer readable code is executed by at least one processor, the foregoing method 300 is performed. In conclusion, various embodiments of the teachings of the present disclosure provide a computing resource scheduling method, a scheduler, an IoT system, and a computer readable medium. The computing resource is scheduled according to the processing priority of the data to be processed.

Accurate priority-based scheduling is implemented, and the computing resource amount and the duration required for data processing are ensured, so that resources can be optimally scheduled, and data processing tasks can be efficiently completed. When determining the processing priority, fluctuation of the value of the physical quantity represented by the data to be processed is considered. When a fluctuation amplitude is large, it is considered the data to be processed should be preferentially processed, so that an emergency such as a device fault is handled in real time, and computing resources can be effectively allocated to urgent problems.

During prediction and scheduling of computing resources, the data to be processed may be sorted according to the processing priority, and processing based on the FIFO mechanism further ensures timely processing of data to be processed which is with a high priority. Further, a heartbeat mechanism is used to obtain latest statuses of the computing resources, thereby ensuring effective scheduling of the computing resources. In addition, when the computing resource amount and the computing resource amount required for processing the data to be processed are predicted, reference is made to information about the historical data, so that a prediction result is more accurate, and accurate and reliable information is provided for further allocation of the computing resources.

In some embodiments, there is a scheduler (40), comprising: a receiving module (401), configured to receive data to be processed which is collected by a sensor (10) in an Internet of Things (IoT) system (100); a priority determining module (402), configured to determine a processing priority of the data to be processed; and a scheduling module (403), configured to: predict, according to the processing priority determined by the priority determining module (402), a computing resource amount and duration required for processing the data to be processed; and schedule a computing resource of an edge computing device in the IoT system according to the predicted computing resource amount and duration to process the data to be processed.

In some embodiments, the priority determining module (402) is configured to determine the processing priority of the data to be processed, wherein a larger fluctuation amplitude of a value of a physical quantity represented by the data to be processed indicates a higher processing priority of the data to be processed.

In some embodiments, the scheduling module (403) is configured to predict, according to the determined processing priority, the computing resource amount and the duration required for processing the data to be processed, wherein a higher processing priority indicates sooner prediction, for the data to be processed, of the computing resource amount and the duration required for processing the data to be processed.

In some embodiments, wherein when predicting, according to the determined processing priority, the computing resource amount and the duration required for processing the data to be processed, the scheduling module (403) is configured to: search for a computing resource amount and duration occupied during processing of historical data, wherein the historical data is similar to the data to be processed in length, sensor type, and processing priority; and predict, according to the found resource amount and duration occupied during the processing of the historical data, the computing resource amount and the duration required for processing the data to be processed.

In some embodiments, wherein when scheduling the computing resource of the edge computing device in the IoT system according to the predicted computing resource amount and duration to process the data to be processed, the scheduling module (403) is configured to select a computing resource of an edge computing device that satisfies the predicted computing resource amount and duration from edge computing devices in the IoT system, to process the data to be processed.

It should be noted that, in the foregoing procedures and system structural diagrams, not all steps and modules are necessary, and some steps or modules may be omitted according to actual needs. A performing sequence of steps is not fixed and may be adjusted according to needs. System structures described in the foregoing embodiments may be physical structures or may be logical structures. That is, some modules may be implemented by a same physical entity, or some modules may be implemented by at least two physical entities, or may be implemented by some parts in at least two independent devices.

In the foregoing embodiments, a hardware unit may be implemented in a mechanical manner or an electrical manner. For example, a hardware unit may include a non-volatile dedicated circuit or logic (for example, a dedicated processor, a Field-Programmable Gate Array (FPGA), or an Application Specific Integrated Circuit (ASIC)) to complete corresponding operations. The hardware unit may further include programmable logic or a circuit (for example, a general processor or another programmable processor), which may be temporarily set by software to complete corresponding operations. A specific implementation (a mechanical manner, a dedicated non-volatile circuit, or a temporarily specified circuit) may be determined in consideration of costs and time.

The foregoing presents and describes the embodiments of the present teachings in detail by using the accompanying drawings and preferred embodiments. However, the embodiments of the present disclosure are not limited to the disclosed embodiments. Based on the foregoing embodiments, a person skilled in the art may learn that code verification means in the foregoing different embodiments may be combined to obtain more embodiments of the present disclosure. The embodiments also fall within the protection scope of the embodiments of the present disclosure.

What is claimed is:

1. A resource scheduling method comprising:
   receiving data to be processed collected by a sensor in an Internet of Things system;
   determining a processing priority of the data to be processed;
   predicting, according to the determined processing priority, a computing resource amount and duration required for processing the data to be processed;
   scheduling a computing resource of an edge computing device in the IoT system according to the predicted computing resource amount and duration to process the data to be processed;
   executing the edge computing device in the IoT system as scheduled to provide the computing resource required to process the received data; and
   wherein the predicting, according to the determined processing priority, a computing resource amount and duration required for processing the data to be processed comprises: searching for a computing resource amount and duration occupied during processing of historical data, wherein the historical data is similar to the data to be processed in length, sensor type, and processing priority; and predicting, according to the found computing resource amount and duration occupied during the processing of the historical data, the computing resource amount and the duration required for processing the data to be processed.

2. The method according to claim 1, wherein: determining a processing priority of the data to be processed comprises determining the processing priority of the data to be processed; and a larger fluctuation amplitude of a value of a physical quantity represented by the data to be processed indicates a higher processing priority of the data to be processed.

3. The method according to claim 1, wherein: predicting, according to the determined processing priority, a computing resource amount and duration required for processing the data to be processed comprises predicting, according to the determined processing priority, the computing resource amount and the duration required for processing the data to be processed; and a higher processing priority indicates sooner prediction, for the data to be processed, of the computing resource amount and the duration required for processing the data to be processed.

4. The method according to claim 1, wherein scheduling a computing resource of an edge computing device in the IoT system according to the predicted computing resource amount and duration to process the data to be processed comprises selecting a computing resource of an edge computing device that satisfies the predicted computing resource amount and duration from edge computing devices in the IoT system, to process the data to be processed.

5. The method according to claim 1, further comprising recording, after the data to be processed has been processed, a computing resource amount and duration used for processing the data to be processed.

6. A scheduler comprising:
   a memory configured to store a computer readable code; and
   a processor configured to execute the computer readable code stored in the memory to:
   receiving data to be processed which is collected by a sensor in an Internet of Things system;
   determining a processing priority of the data to be processed;
   predicting, according to the determined processing priority, a computing resource amount and duration required for processing the data to be processed;
   scheduling a computing resource of an edge computing device in the IoT system according to the predicted computing resource amount and duration to process the data to be processed;
   executing the edge computing device in the IoT system as scheduled to provide the computing resource required to process the received data; and
   wherein when predicting, according to the determined processing priority, a computing resource amount and duration required for processing the data to be processed, the processor is further configured to: search for a computing resource amount and duration occupied during processing of historical data, wherein the historical data is similar to the data to be processed in length, sensor type, and processing priority; and predict, according to the found computing resource amount and duration occupied during the processing of the historical data, the computing resource amount and the duration required for processing the data to be processed.

7. The scheduler according to claim 6, wherein: when determining a processing priority of the data to be processed, the at least one processor is further configured to determine the processing priority of the data to be processed; and a larger fluctuation amplitude of a value of a physical quantity represented by the data to be processed indicates a higher processing priority of the data to be processed.

8. The scheduler according to claim 6, wherein when predicting, according to the determined processing priority, a computing resource amount and duration required for processing the data to be processed, the processor is further configured to predict, according to the determined processing priority, the computing resource amount and the duration required for processing the data to be processed; and a higher processing priority indicates sooner prediction, for the data to be processed, of the computing resource amount and the duration required for processing the data to be processed.

9. The scheduler according to claim 6, wherein when scheduling a computing resource of an edge computing device in the IoT system according to the predicted computing resource amount and duration to process the data to be processed, the processor is further configured to select a computing resource of an edge computing device that satisfies the predicted computing resource amount and duration from edge computing devices in the IoT system, to process the data to be processed.

10. The scheduler according to claim 6, wherein the processor is further configured to record, after the data to be processed has been processed, a computing resource amount and duration used for processing the data to be processed.

11. A non-transitory storage medium storing a computer readable code, wherein when the computer readable code is executed by at least one processor, the computer readable code is configured to:
receive data to be processed which is collected by a sensor in an Internet of Things system;
determine a processing priority of the data to be processed;
predict, according to the determined processing priority, a computing resource amount and duration required for processing the data to be processed;
schedule a computing resource of an edge computing device in the IoT system according to the predicted computing resource amount and duration to process the data to be processed;
executing the edge computing device in the IoT system as scheduled to provide the computing resource required to process the received data; and
wherein when predicting, according to the determined processing priority, a computing resource amount and duration required for processing the data to be processed, the computer readable code is further configured to: search for a computing resource amount and duration occupied during processing of historical data, wherein the historical data is similar to the data to be processed in length, sensor type, and processing priority; and predict, according to the found computing resource amount and duration occupied during the processing of the historical data, the computing resource amount and the duration required.

12. The storage medium according to claim 11, wherein: when determining a processing priority of the data to be processed, the computer readable code is further configured to determine the processing priority of the data to be processed; and a larger fluctuation amplitude of a value of a physical quantity represented by the data to be processed indicates a higher processing priority of the data to be processed.

13. The storage medium according to claim 11, wherein: when predicting, according to the determined processing priority, a computing resource amount and duration required for processing the data to be processed, the computer readable code is further configured to predict, according to the determined processing priority, the computing resource amount and the duration required for processing the data to be processed; and a higher processing priority indicates sooner prediction, for the data to be processed, of the computing resource amount and the duration required for processing the data to be processed.

14. The storage medium according to claim 11, wherein when scheduling a computing resource of an edge computing device in the IoT system according to the predicted computing resource amount and duration to process the data to be processed, the computer readable code is further configured to select a computing resource of an edge computing device that satisfies the predicted computing resource amount and duration from edge computing devices in the IoT system, to process the data to be processed.

15. The storage medium according to claim 11, wherein the computer readable code is further configured to record, after the data to be processed has been processed, a computing resource amount and duration used for processing the data to be processed.

16. An Internet of Things system comprising:
a sensor;
a data collection module connected to the sensor;
an edge computing device configured to provide a computing resource required for data processing to the IoT system; and
a scheduler connected to the data collection module and configured to:
receive, from the data collection module, data to be processed which is collected by the sensor;
determine a processing priority of the data to be processed;
predict, according to the determined processing priority, a computing resource amount and duration required for processing the data to be processed;
schedule a computing resource of the at least one edge computing device according to the predicted computing resource amount and duration to process the data to be processed;
executing the edge computing device in the IoT system as scheduled to provide the computing resource required to process the received data; and
wherein when predicting, according to the determined processing priority, a computing resource amount and duration required for processing the data to be processed, the computer readable code is further configured to: search for a computing resource amount and duration occupied during processing of historical data, wherein the historical data is similar to the data to be processed in length, sensor type, and processing priority; and predict, according to the found computing resource amount and duration occupied during the processing of the historical data, the computing resource amount and the duration required.

17. An edge distributed data processing system configured to process data collected by a sensor in an Internet of Things system, the system comprising:
an edge computing device configured to provide a computing resource required for data processing to the IoT system; and a scheduler configured to:
receive from a data collection module in the IoT system data to be processed collected by a sensor;
determine a processing priority of the data to be processed;
predict, according to the determined processing priority, a computing resource amount and duration required for processing the data to be processed;
schedule a computing resource of the edge computing device according to the predicted computing resource amount and duration to process the data to be processed;

executing the edge computing device in the IoT system as scheduled to provide the computing resource required to process the received data; and wherein when predicting, according to the determined processing priority, a computing resource amount and duration required for processing the data to be processed, the computer readable code is further configured to: search for a computing resource amount and duration occupied during processing of historical data, wherein the historical data is similar to the data to be processed in length, sensor type, and processing priority; and predict, according to the found computing resource amount and duration occupied during the processing of the historical data, the computing resource amount and the duration required.

* * * * *